Aug. 15, 1961  J. A. ROBERTS  2,996,661
LEAK DETECTOR PROPORTIONING PROBE
Filed Feb. 17, 1959  2 Sheets-Sheet 1
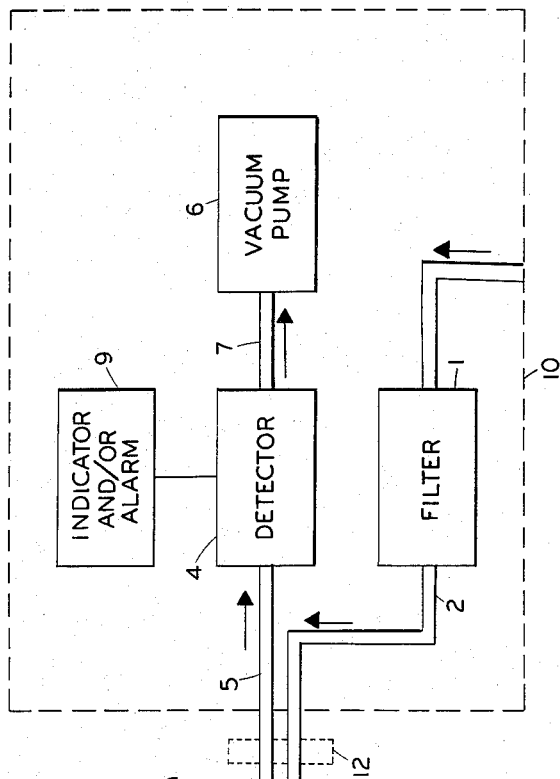
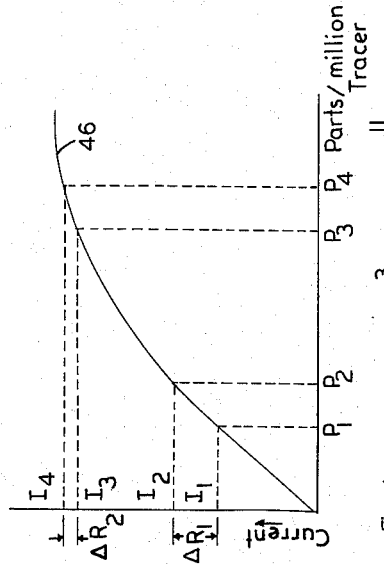
INVENTOR.
John A. Roberts
BY
Irving M. Freedman
His Attorney Aug. 15, 1961    J. A. ROBERTS    2,996,661
LEAK DETECTOR PROPORTIONING PROBE
Filed Feb. 17, 1959    2 Sheets-Sheet 2

INVENTOR.
John A. Roberts
BY
Irving M. Freedman
His Attorney though the discharge device to a vacuum pump. The presence of a leak produces an increased amount of tracer gas in the region of the leak area which in turn produces a corresponding variation in current in the electrical discharge device circuit. Such variations may be indicated either through an instrument in circuit with the current or by a signaling device actuated at some preset amount of current.

The amount of background tracer gas present in the test area is drawn into the probe along with the tracer gas resulting from the leak and affects the indication. Since the background tracer gas varies from area to area and from time to time in a given area, it is common practice to utilize a sensitivity control associated with the equipment to compensate for such variations and cause the leak detector to indicate only variations above the background level. The sensitivity control is normally associated with the electronic circuitry of the equipment, which in the usual installation is stationary and connected to the probe through a length of flexible tubing. Remotely locating the electronic sensitivity control at the probe facilitates ready adjustment but necessitates the presence of electrical wiring and voltages in the flexible connecting tube and the indicating probe.

Furthermore, with such an arrangement, it has been found that subjecting the sensitive or detector element of the leak detector to large concentrations of tracer gas deteriorates and reduces the sensitivity of the sensitive element much quicker than that occasioned by usage at low levels of tracer gas concentration. While it is good practice to avoid subjecting the sensitive element to such large concentrations of gas, it has been found that passing a flow of pure or contamination-free gas through the sensitive element for a period of time will regain some of the lost sensitivity and reactivate the element. In addition, large concentrations of tracer gas cause a saturating effect on the response characteristic of the leak detector so that the percentage response is much lower at high concentrations of the tracer gas than at lower concentrations for a given increase in tracer concentration.

It is an object of this invention to provide an improved leak detector probe in which the response of the system to a given amount of tracer gas may be adjusted by the operator at the probe.

A further object of this invention is to provide an improved leak detector in which the effective sensitivity of the system may be accomplished by selectively controlling the amount of tracer gas drawn into the probe.

A still further object of this invention is to provide an improved leak detector probe having a proportioning arrangement in which the proportion of gas drawn into the probe from the area under test may be readily varied relative to a predetermined gas flow obtained through combination of the test area gas and a flow of contamination-free gas.

Another object of the invention is to provide a simple, yet trouble-free, gas inlet flow control for a leak detector probe.

Yet another object of this invention is to provide an improved leak detector probe in which the gas drawn into the probe from the area under test may be reduced to zero so that only contamination-free gas reaches the leak detector sensitive element in order to reactivate the same.

An additional object of this invention is to provide a remote visual indication of detected leaks in a probe of the proportioning type.

Further objects and advantages of the invention will become apparent as the following description proceeds and the features of novelty which characterize the invention will be pointed out with particularity in the claims annexed to and forming a part of this specification.

In accordance with one form of the invention, contamination-free gas provided by air drawn from the atmosphere through a filtering arrangement, is passed through a mixing chamber in the leak detector probe to the detecting and indicating unit of the system. A variable orifice is provided between the leak detector probe tip and the mixing chamber such that the total gas drawn through the sensitive element from the mixing chamber is a mixture of the contamination-free flow and the gas flow through the variable orifice. The proportion of the gas being tested to that of the combined flow is controlled by adjustment of the variable orifice.

For a better understanding of this invention, reference may be had to the accompanying drawings, in which:

FIGURE 1 is a simplified diagrammatical showing of a leak detector system incorporating the subject invention;

FIGURE 4 is a plot of leak detector response versus parts per million of tracer gas useful in explaining the invention.

Figure 2:
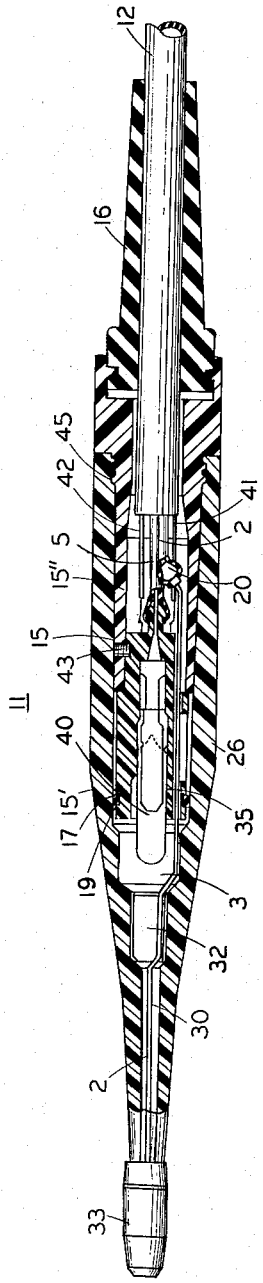
FIGURE 2 is a partial cross-sectional view of a leak detector probe incorporating the invention.

Referring to FIGURE 1, air is drawn in the direction of the arrows successively through filter 1 for the removal of background tracer gas and other contaminations, through passageway 2 and mixing chamber 3, and through the detecting element 4 via passageway 5 by means of vacuum pump 6 connected to detecting element 4 by tube 7. The leak detector probe 11 is passed near welds, seams, joints, or other areas suspected of leakage, and the associated atmosphere is drawn through variable orifice 8 to the detector 4 via mixing chamber 3 and passageway 5. The mixture of the gas passing through the filter 1 and variable orifice 8 is passed through the electrical discharge device or sensitive element in detector 4 to induce positive ion formation at the positively charged electrode in a manner well known in the art and as described in more detail in the aforesaid Rice patent. Variations in the resultant current flow are indicated by the indicator and/or alarm 9, with the magnitude of variation being dependent upon the amount of tracer gas present. In a typical installation, the detector 4, filter 1, indicator and/or alarm 9, and vacuum pump 6 are assembled within a unit which may conveniently be referred to as control unit 10. The variable orifice 8 and chamber 3 are housed in the probe 11 and connected to the control unit 10 by a flexible tube 12 which may contain both the passageway 2 and the passageway 5. Since vacuum pump 6 draws a predetermined gas flow through detector 4, the size of the variable orifice 8 determines the proportion of the total flow supplied through the variable orifice with the remainder coming from the filter 1 and the passageway 2.

Figure 3:
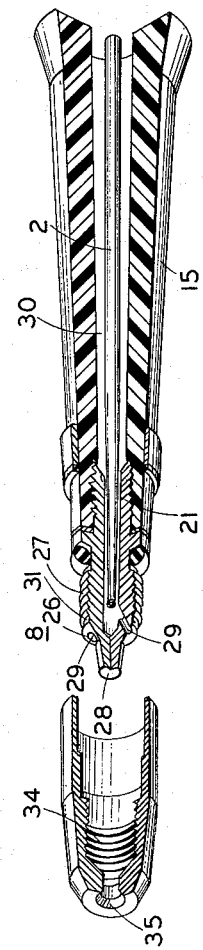
FIGURE 3 is a cross-sectional view of a portion of the probe shown in FIGURE 2 and better illustrating the variable orifice arrangement.

The construction of a probe incorporating the subject invention is shown in detail in FIGURES 2 and 3. Referring to these figures it will be seen that the probe 11 is constructed of two principal parts, the plastic shell 15, comprising sections 15' and 15", and the resilient end section 16 which securely grips flexible tube 12. Gasket or seal 17 is interposed between the inner surface of shell section 15' and groove 19 associated with shell section 15" to prevent in-leakage.

Contained within flexible tube 12 and terminating at one end of the mixing chamber 3 is the passageway or tube 5 which connects at the other end to the detector 4. The passageway or tube 2 which leads from the filter 1 is also contained within the flexible tube 12 and is connected through a gas-tight coupling 20 to terminate at end 21 proximate to the variable orifice 8. The diameter of shell 15 in the central region 25 is such as to facilitate hand holding thereof and tapers inwardly toward the probe tip 26. The shell 15 has circumferential threads 27 formed in the region of the tip and a central tapered projection 28 extending outwardly in an axial direction from the central region of tip 26. A plurality of passageways or orifices 29 are circumferentially spaced about the region intermediate the central projection 28 and the threads 27 at the end of tip 26 and extend angularly inward to the interior passageway or orifice 30 extending axially along the central region of the shell 15. The diameter of passageway 30 is greater than that of tube 2 so that gas drawn through the orifices 29 and tube 2 can pass around the tube 2, through the mixing chamber and to the detector 4 via tube 5. The interior passageway 30 is thus an extension or part of the mixing chamber 3.

In order to prevent dust or other foreign bodies in the gas flow from reaching the detector 4, a filter 32 such as one of the cellulose fiber type is inserted in the gas flow path of the mixing chamber 3. The filter is periodically replaced.

End cap or control member 33 is rotatably secured to the tip 26 through the cooperation of the interior threads 34 with the threads 27 to position the central aperture 35 of the control member concentrically around the tapered projection 28. Rotation of the end cap 33 produces a relative axial movement between the orifice 35 and the projection 28 to vary the size of the passageway or variable orifice therebetween to control the gas flow drawn through the orifice. In order to prevent leakage between the cap 33 and tip 26 an O-ring or gasket is provided in a circumferential groove 31 positioned between the orifices 29 and the threads 27.

The taper of the projection 28 relative to orifice 35 is such that the end cap 33 may be rotated sufficiently to completely close the variable orifice 8. Such an arrangement is desirable in leak detectors of the type described since as already pointed out it has been found that the sensitivity of the sensitive element associated with the detector 4 decreases rapidly when the sensitive element is exposed to large concentrations of a tracer gas such as those consisting in part of the halogen family. The sensitivity may be increased and the sensitive element reactivated by passing pure air or contamination-free gas flow over the sensitive element for a period of time. By completely closing the variable orifice the only gas flow reaching the sensitive element will be that coming through the filter 1 and will be of sufficient purity to effectively reactivate or purge the sensitive element.

It is desirable to be able to control the amount of tracer gas reaching the detector due to background tracer. As shown in FIGURE 4 the best leak detector response can be obtained at an ambient or background level which does not result in operation in the "saturated" response area. Referring to FIGURE 4, a typical current response curve 46 of a halogen type leak detector is shown plotted versus parts per million of tracer gas. It can be seen that a leak detector operating with a background level of tracer reaching the detector P1 will produce a current I1 and an increase of tracer to P2 due to a leak will produce a current I2 with the resultant $\Delta R_1$ being the leak response. Similarly a background tracer level P3 will produce a current I3 and an increase of tracer due to a leak equal in amount to the difference between P1 and P2 will produce a current I4, with $\Delta R_2$ being the leak response. It should be noted that the leak detector responds better in the linear region of the response curve than in the "saturated" region since $\Delta R_1$ is greater than $\Delta R_2$ even though the incremental change of tracer gas was the same in both instances. In probing regions having a high background of tracer gas the linear response region may readily be realized by decreasing the variable orifice 8 to decrease the amount of background tracer gas drawn into the probe.

It is preferable that tube 2 terminate close to orifices 29. It has been found that the turbulence and eddy currents produced by the gas flow from tube 2 to mixing chamber 3 in the region of orifices 29 assists in quickly picking up and carrying gas from the test area which has passed through variable orifice 8. It is believed that some of the random eddy currents are out one orifice 29 and in another to facilitate the drawing of the test area gas into mixing chamber 3. Since the time of response of a leak detector depends mainly upon the time required for the tracer to pass through the probe and connecting tube to the detector, such an arrangement has been found to decrease the response time, particularly when probing small leaks.

In order to provide a visual indication of leaks at the probe which is often located fifteen feet or more from the control unit, a lamp 40 is centrally located within the aperture 35 and is connected to the control unit 10 through a pair of electrical leads 41 and 42 contained within flexible tube 12. In order that the lighting of the lamp 40 may be visible, the shell 15 is constructed of two parts, a transparent plastic portion 15' and a non-transparent portion 15". It should be noted that the central aperture 35 is larger than the lamp assembly so that the gas flow in the region between the lamp assembly and the shell member 15" is not hampered.

It may thus be seen that vacuum pump 6 draws contamination free gas through the filter 1 and the associated tubing to the mixing chamber 3 and also draws gas from the area being tested through the variable orifice 8 to the same mixing chamber where the combination of gases is drawn to the detector 4. The proportion of the gas from the area under test relative to the total flow may be selectively controlled by varying the orifice 8.

Therefore, while a particular embodiment of the subject invention has been shown and described herein, this is in the nature of description rather than limitation, and it will occur to those skilled in the art that various changes, modifications and combinations may be made within the province of the appended claims and without departing either in spirit or scope from this invention in its broader aspects.

What I claim as new and desire to secure by Letters Patent of the United States is:

1. In a leak detector system of the type in which an element sensitive to a tracer gas is subjected to gas flow drawn through a probe moved relative to localized portions surrounding an object under test containing tracer gas in order to detect the presence of the tracer as a leak indication, an improved probe comprising, a probe housing, a mixing chamber, a first entrance passageway connected to said mixing chamber and adapted to conduct a flow of gas to said chamber, an exit passageway leading from said mixing chamber and adapted to conduct a predetermined continuous flow of gas to the sensitive element of the leak detector system, a third passageway connected with said chamber and passing through said housing to the outside of said probe for drawing gas from the area under test, and a variable orifice in said third passageway, the position of said variable orifice determining the amount of gas from said third passageway which is mixed with the gas from said first passageway, thereby controlling the relative proportion of said gases supplied to said sensitive element by controlling the gas flow from the area under test.

2. In a leak detector system of the type in which an element sensitive to a tracer gas is subjected to gas flow drawn through a probe moved relative to localized portions surrounding an object under test containing tracer gas in order to detect the presence of the tracer as a leak indication, an improved probe comprising, a probe housing, a mixing chamber, a first entrance passageway connected to said mixing chamber, an exit passageway leading from said mixing chamber and adapted to conduct a predetermined flow of gas to the sensitive element of the leak detector system, a third passageway extending from said chamber to the outside of said probe for drawing gas from the area under test, and a variable orifice in said third passageway, said variable orifice being adjustable through a control member mounted on said housing, the position of said variable orifice determining the amount of gas from said third passageway which is mixed with the gas from said first passageway, thereby controlling the relative proportion of said gases supplied to said sensitive element by controlling the gas flow from the area under test.

3. In a leak detector system of the type in which an element sensitive to a tracer gas is subjected to gas flow drawn through a probe moved relative to localized portions surrounding an object under test containing tracer gas in order to detect the presence of the tracer as a leak indication, an improved probe comprising, a probe housing, a mixing chamber, a first entrance passageway connected to said mixing chamber, an exit passageway leading from said mixing chamber and adapted to conduct a predetermined fixed flow of gas to the sensitive element of the leak detector system, a third passageway extending from the said chamber to the outside of said probe for drawing gas from the area under test, and a variable orifice in said third passageway to control the gas flow therethrough, said variable orifice being accomplished through the relative movement between a control member and a fixed member both of which are associated with said housing, the position of said variable orifice determining the amount of gas from said third passageway which is mixed with the gas from said first passageway, thereby controlling the relative proportion of said gases supplied to said sensitive element by controlling the gas flow from the area under test.

4. In a leak detector system of the type in which an element sensitive to a tracer gas is subjected to gas flow drawn through a probe moved relative to localized portions surrounding an object under test containing tracer gas in order to detect the presence of the tracer as a leak indication, an improved probe comprising, a probe housing, a mixing chamber within said housing, a first entrance passageway connected to said mixing chamber adapted to conduct a flow of tracer-free gas, an exit passageway leading from said mixing chamber and adapted to conduct a predetermined flow of gas to the sensitive element of the leak detector system, a third passageway extending from the said chamber through said probe, and a variable orifice in said third passageway, said variable orifice including a rotatably mounted control member containing a central aperture, and a fixed projection on said probe which cooperates with said central aperture such that rotation of said control member varies the orifice therebetween.

5. In a leak detector system of the type in which an element sensitive to a tracer gas is subjected to gas flow drawn through a probe moved relative to localized portions surrounding an object under test containing tracer gas in order to detect the presence of the tracer as a leak indication, an improved probe comprising, a probe housing, a mixing chamber within said housing, a first entrance passageway connected to said mixing chamber and adapted to conduct a flow of tracer-free gas, an exit passageway leading from said mixing chamber and adapted for connection to the sensitive element of the leak detector system, a third passageway extending between said chamber and the outside of said probe, and a variable orifice in said third passageway, said variable orifice including a rotatably mounted control member containing a central aperture, a fixed tapered projection on said probe to cooperate with said central aperture, and threads associated with said housing such that rotation of said control moves the control member relative to said tapered projection in the axial direction thereof and varies the orifice therebetween, said movement and said projection being such that the orifice may selectively be completely closed.

6. In a leak detector system of the type in which an element sensitive to a tracer gas is subjected to gas flow drawn through a probe moved relative to localized portions surrounding an object under test containing tracer gas in order to detect the presence of the tracer as a leak indication, an improved probe comprising, a probe housing, a mixing chamber within said housing, a first entrance passageway extending through substantially all of said mixing chamber, an exit passageway leading from said mixing chamber and adapted for connection to the sensitive element of the leak detector system, a third passageway extending from said chamber in the region of the open end of said first passageway to the outside of said probe for drawing gas from the area under test and a variable orifice in said third passageway, said variable orifice being adjustable through a control member associated with said housing, the position of said variable orifice determining the amount of gas from said third passageway which is mixed with the gas from said first passageway, thereby controlling the relative proportion of said gases supplied to said sensitive element by controlling the gas flow from the area under test.

7. In a leak detector system of the type in which an element sensitive to a tracer gas is subjected to gas flow drawn through a probe moved relative to localized portions surrounding an object under test containing tracer gas in order to detect the presence of the tracer as a leak indication, an improved probe comprising, a probe housing, a mixing chamber within said housing, a first entrance passageway connected to said mixing chamber from a purified gas supply and adapted to conduct a flow of tracer-free gas, an exit passageway leading from said mixing chamber and adapted for connection to the sensitive element of the leak detector system, a third passageway between said chamber and the outside of said probe, and a variable orifice in said third passageway, said variable orifice including a rotatably mounted control member containing a central aperture, a fixed tapered projection extending axially outwardly from the end of said probe to cooperate with said central aperture, and threads associated with said housing such that rotation of said control moves the control member relative to said tapered projection in the axial direction thereof and varies the orifice therebetween, said movement and said projection being such that the orifice may selectively be completely closed, and at least one passageway extending through said housing from said mixing chamber to said variable orifice.

8. In a leak detector system of the type in which an element sensitive to a tracer gas is subjected to gas flow drawn through a probe moved relative to localized portions surrounding the object under test containing tracer gas in order to detect the presence of the tracer as a leak indication, an improved probe comprising, a probe housing, a mixing chamber formed within said housing, a first entrance passageway connected to said mixing chamber, an exit passageway leading from said mixing chamber and adapted for connection to the sensitive element of the leak detector system, a third passageway connecting the said chamber with the outside of said probe for probing in the area under test, a variable orifice in said third passageway, at least a portion of said housing being transparent, and means to position an indicating lamp in the central region of said housing contiguous to said transparent portion.

References Cited in the file of this patent

UNITED STATES PATENTS

| | | |
|---|---|---|
| 2,579,352 | White | Dec. 18, 1951 |
| 2,706,398 | Davidson | Apr. 9, 1955 |
| 2,928,042 | Lawrance | Mar. 8, 1960 |